May 22, 1945.　　　D. S. C. TURNER　　　2,376,737
VALVE REFACING MACHINE
Filed July 8, 1944　　　3 Sheets-Sheet 1

INVENTOR
Duncan S. C. Turner
BY J. Ledermann
ATTORNEY

May 22, 1945.    D. S. C. TURNER    2,376,737
VALVE REFACING MACHINE
Filed July 8, 1944    3 Sheets—Sheet 2

INVENTOR
Duncan S.C. Turner
BY
J. Lederman
ATTORNEY

May 22, 1945.　　D. S. C. TURNER　　2,376,737
VALVE REFACING MACHINE
Filed July 8, 1944　　3 Sheets-Sheet 3

INVENTOR
Duncan S. C. Turner
BY J. Ledermann
ATTORNEY

Patented May 22, 1945

2,376,737

UNITED STATES PATENT OFFICE 2,376,737

VALVE REFACING MACHINE

Duncan S. C. Turner, Staten Island, N. Y.

Application July 8, 1944, Serial No. 544,087

4 Claims. (Cl. 82—4)

This invention relates to valve refacing machines, and aims to provide a simple, practical and inexpensive machine to take light cuts off, or reface, the valves on the liquid end of a pump; the machine may be applied to a drill press and actuated thereby, or it may be mounted on a bracket and turned by hand. The machine may also be bolted to the pump and the valves refaced by hand, thereby greatly facilitating the labor and the expense of the operation since it eliminates the necessity of dismantling the pump and shipping it to a machine shop to have the valves refaced, as is done in many cases.

The above and other objects will become apparent in the description below, wherein characters of reference refer to like-named parts in the accompanying drawings. It is to be noted that the drawings are intended for the purpose of illustration only, and that it is neither intended nor desired to limit the invention necessarily to the specific details of construction shown excepting insofar as they may be deemed essential to the invention. The machine may of course be applied to other purposes than that above-mentioned as well as to the valves of other machines than pumps.

Referring briefly to the drawings, Fig. 1 is a perspective view of the machine supported on a bracket with the cutter in position above a valve, for hand crank operation.

Figure 1:
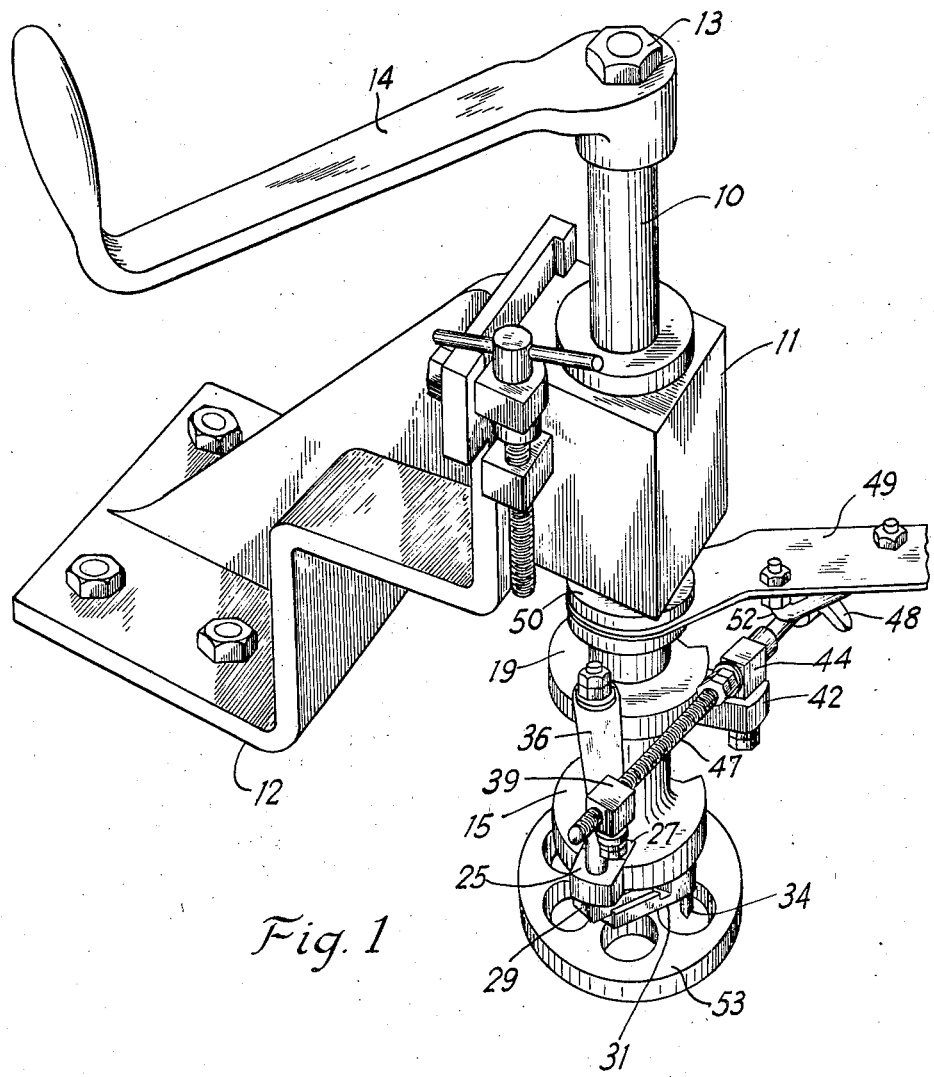
Figure 3:
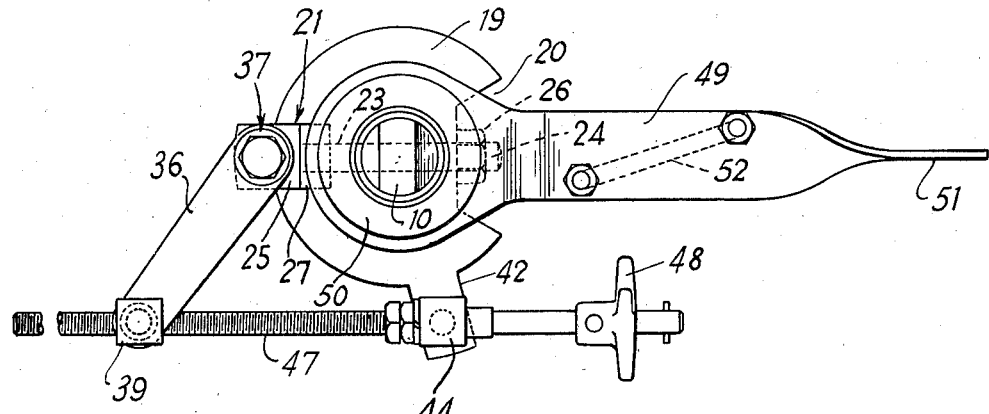
Fig. 3 is a plan view of the machine.
Figure 2:
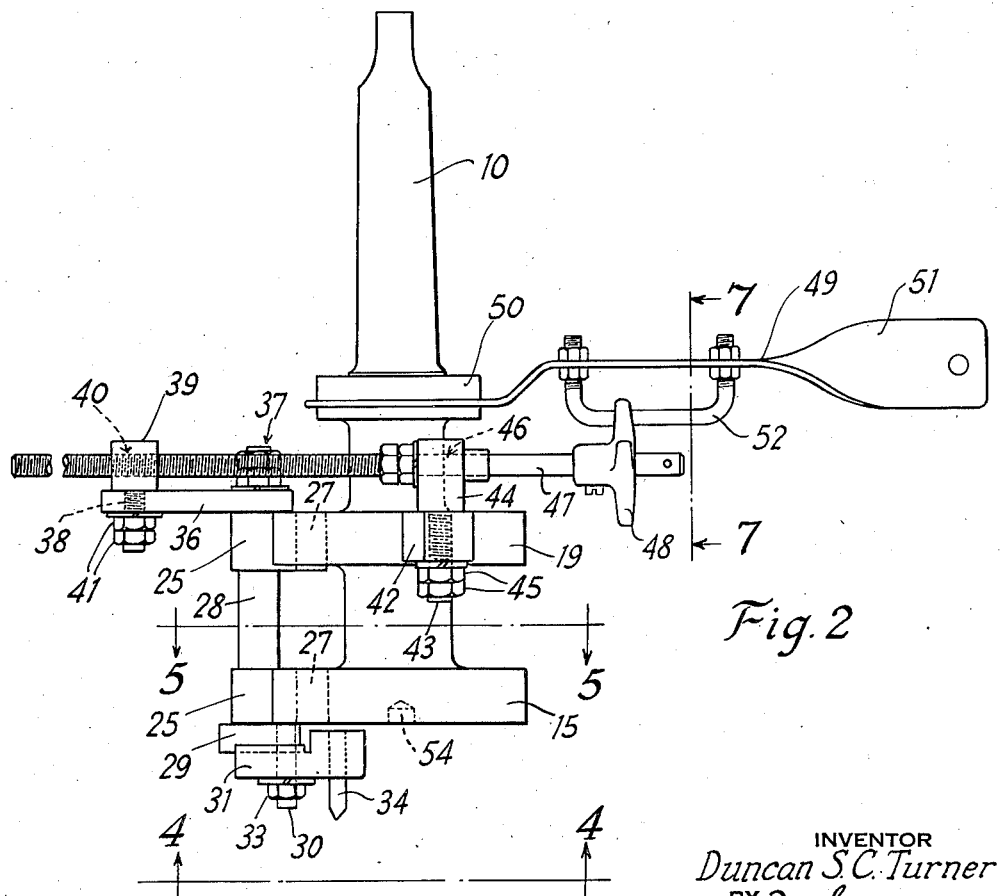
Fig. 2 is a side elevational view of the machine.

Referring in detail to the drawings, the numeral 10 indicates an upright post or shaft which, in the illustration shown in Fig. 1, is rotatably supported in a block 11 on the end of a bracket 12 which may be secured or bolted to any desired support. The entire supporting structure shown, including the block 11 and the bracket 12, form no part of the invention, as they are presented only as showing a means for rotatably supporting the shaft 10.

Figure 5:
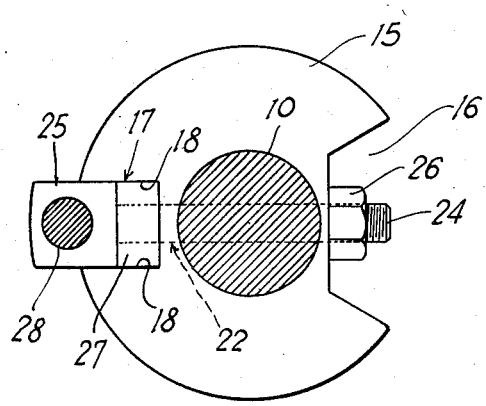
Fig. 5 is a cross-sectional view taken on the line 5—5 of Fig. 2.
Figure 6:
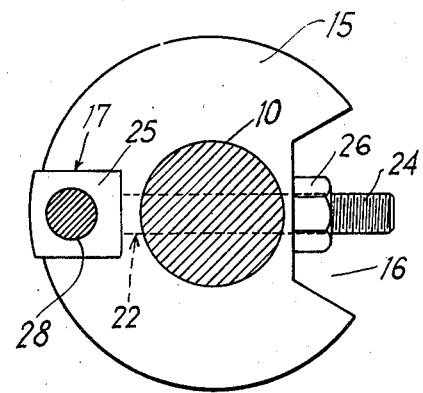
Fig. 6 is a view similar to Fig. 5, but with the cutter spacer blocks removed.
Figure 7:
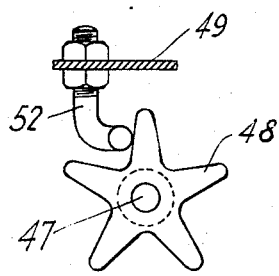
Fig. 7 is a sectional view taken on the line 7—7 of Fig. 2.

The upper end of the shaft 10 is provided with a removable screw 13 for the attachment thereto of a hand crank 14. A relatively thick disc 15 is secured to, or made integral with, the lower end of the shaft 10, and is provided with a pair of opposed radial cut-outs 16 and 17, the latter being narrower than the former and having its side walls 18 mutually parallel. Above and spaced from the disc 15 is a second and substantially identical disc 19, having similar cut-outs 20 and 21 positioned directly above the cut-outs 16 and 17, respectively. Diametral openings 22 and 23, extend through the discs 15 and 19, respectively, from the cut-outs 16 and 20 into the cut-outs 17 and 21, respectively, and these openings are receptive of screw bolts 24 having rectangular heads 25. The openings 22 and 23 are smooth, so that the bolts 24 may readily be slid therethrough. Nuts 26 are adapted to tighten the bolt heads 25 in the cut-outs 17 and 21. Rectangular spacer blocks 27 having openings therethrough, similar to the openings 22 and 23 to permit passage of the bolts 24 through them. When the bolts are secured as shown in Fig. 6, without the spacers 27, the heads 25 are positioned as shown, relatively close to the shaft 10; when the spacers are included, the bolt heads 25 are positioned farther from the shaft 10, as shown in Fig. 5.

The bolt heads 25 are provided with aligned vertical openings therethrough, through which the ends of a cylindrical column 28 pass rotatably. An arm 29 is rigidly secured at right angles to the lower extremity of the column 28, and a threaded bolt 30 projects downward therefrom. Slidably mounted longitudinally on the arm 29 is a rider 31 having a longitudinal slot 32 through which the bolt 30 passes. A nut 33 on the screw 30 serves to lock the rider 31 in any position within the range provided by the slot 32 so that the rider may be slid forward or backward. A downwardly projecting cutter 34 is held in an opening in the end of the rider 31 by a set screw 35.

A crank arm 36 is secured by the bolt and nut 37 to the upper extremity of the column 28. A screw bolt 38 passes loosely through a vertical opening in the end of the crank 36 and has rigid on its upper end a block 39 having a threaded horizontal opening therethrough, 40. The bolt 38 is loosely and pivotally locked on the crank 36 by nuts 41. A radial extension or tongue 42 on the disc 19 has a vertical opening therethrough through which a screw bolt 43 passes, the latter being rigid and depending from a block 44 mounted on the tongue 42. Nuts 45 lock the bolt 43 loosely and pivotally in the tongue 42. The block 44 has a horizontal smooth opening 46 therethrough. A threaded stem 47 passes through the openings in both blocks 44 and 39 and has a star wheel 48 rigid thereon near one end thereof. It is apparent that turning of the star wheel will rotate the stem 47 loosely in the block 44 and in threadable engagement with the block 39 and thereby swing the crank 36 in one direction or the other.

Figure 4:
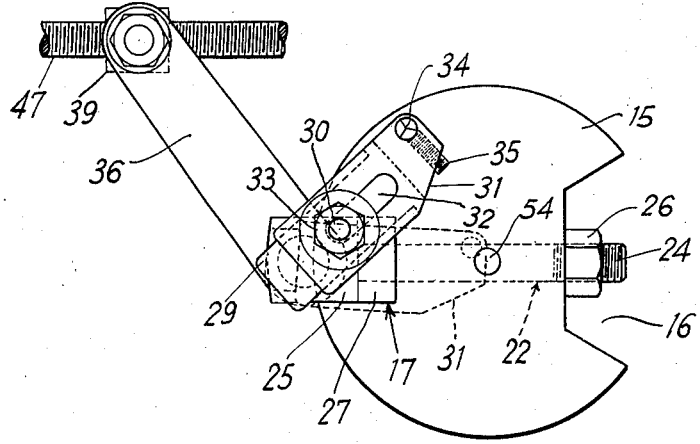
Fig. 4 is a bottom plan view of the machine.

A sweep arm 49 is rigidly secured in a collar 50 on the shaft 10, and its extremity 51 is twisted into a vertical plane to provide a handle for manual rotation of the shaft if and when desired for purposes of adjustment. A U-shaped member 52 is secured to and extends downward from the arm 49 to a level intermediate the depth of the spaces between the teeth of the star wheel 48, and this member, which serves in the manner of a cam, may readily be termed a cam. It is apparent that once each revolution of the shaft and hence the star wheel, the latter strikes the cam 52 and is turned through an arc of one tooth, whence the stem 47 is also turned through the same arc. Thus, as the shaft 10 turns continuously, the crank arm 36 will be swung intermittently, and the direction of rotation of the shaft 10 during operation of the machine is such as to cause the crank arm 36 to swing in a clockwise direction (Fig. 4) so as to work the cutter 34 slowly toward the center or vertical axis of the machine.

At 53 in Fig. 1 is shown a typical pump valve in position below the cutter of the machine. The valve is of course held immovable by any means, not shown, as when, for instance, it is in its position in the pump, and the cutter is positioned just above the surface of the valve near the periphery thereof at the start of the operation. As the shaft 10 is then continuously rotated, the cutter 34 rotates with it, and for the first revolution it shaves off a circular strip from the valve. Upon completion of one revolution, the cutter is advanced a short distance centerward, as above-mentioned, and during the next revolution shaves off a circular strip of smaller diameter. The process is thus continued until the cutter reaches the center of the valve.

When the valve worked upon is of substantially large diameter, the spacers 27 are mounted in place so that the cutter may begin the operation at a greater distance from the center.

In the above description but one method of carrying out the invention has been presented, and numerous details of construction have been set forth, many of which are of no consequence other than to serve to present the invention in the form of a complete and workable machine. Such details may of course be modified at will, and any other means or manner of achieving the desired function may be substituted for such details as set forth.

Obviously, other modifications in form and structure may be made without affecting or limiting the spirit and scope of the invention.

At 54 is shown a small hole in the underside of the lower disc 15, and this serves to aid in centering the machine when positioning it ready for operation.

I claim:

1. A valve refacing machine comprising a vertical shaft, a pair of spaced discs rigid with said shaft at right angles thereto, a vertical column pivotally secured to and supported by said discs, an extension on the upper of said discs having a block pivotally mounted therein, an arm secured to the top of said column, a block pivotally mounted on the end of said arm, said blocks having lateral openings therethrough adapted to be aligned, said opening through said second block being threaded, a screw passing through said openings and engaging said threaded opening, a star wheel on the end of said screw and rigid therewith, a sweep arm rotatably mounted on said shaft having a cam-like projection projecting into the orbit of said star wheel, a cutter secured to the lower extremity of said column and extending under said lower disc.

2. The device set forth in claim 1, said discs having spacer members removable to decrease the radial distance of said column from the axis through said shaft.

3. The device set forth in claim 1, said discs having vertically aligned cut-outs therein, spacer members removably mounted in said cut-outs between said column and said discs.

4. The device set forth in claim 1, said cutter comprising a member rigid on said column and a member longitudinally slidable on said rigid member.

DUNCAN S. C. TURNER.